United States Patent [19]

Schwartz et al.

[11] Patent Number: 5,408,729
[45] Date of Patent: Apr. 25, 1995

[54] APPARATUS FOR CLAMPING AN ELONGATED FLEXIBLE MEMBER

[75] Inventors: Carl I. Schwartz; William L. Benson, both of Grand Blanc; Richard W. Cantley, Troy; William D. Goslin, Lapeer; Robert L. Kniss, St. Louis; James B. Gruda, Rochester, all of Mich.

[73] Assignee: C.I.S.-LRC Joint Venture, Flint, Mich.

[21] Appl. No.: 208,425

[22] Filed: Mar. 8, 1994

[51] Int. Cl.⁶ .............................. F16G 11/00
[52] U.S. Cl. .................... 24/134 R; 24/132 WL; 24/134 KB
[58] Field of Search .......... 24/134 R, 134 KB, 134 P, 24/133, 132 WL, 191, 71 J; 403/374

[56] References Cited

U.S. PATENT DOCUMENTS

| | | | |
|---|---|---|---|
| 895,590 | 8/1908 | Sprague | 24/134 R |
| 1,272,392 | 7/1918 | Craven et al. | 24/134 P |
| 2,080,700 | 5/1937 | Dale | 24/134 R |
| 2,471,503 | 5/1949 | Ward et al. | 24/134 R |
| 3,437,981 | 4/1969 | Keller | 24/134 R |
| 3,863,299 | 2/1975 | Hocq | 24/71 J |
| 4,424,611 | 1/1984 | Mori | 24/71 J |
| 4,425,862 | 1/1984 | Hirsch et al. | 24/134 R |
| 4,541,149 | 9/1985 | Jensen | |
| 4,639,978 | 2/1987 | Boden | |
| 4,878,270 | 11/1989 | Westerkamp | 24/134 R |
| 5,050,786 | 9/1991 | Demott | 24/134 R |
| 5,327,845 | 7/1994 | Cook | 114/218 |
| 5,327,847 | 7/1994 | Cook | 114/218 |

Primary Examiner—Victor N. Sakran

[57] ABSTRACT

An apparatus for releasably clamping an elongated flexible member is provided. This clamping apparatus includes body defining at least one passage therethrough. A clamping member is operatively associated with the body member such that a portion of the clamping member can be selectively moved into and out of the passage. Juxtaposed clamping surfaces on the clamping member and the body converge and diverge as the clamping member is moved into and out of the passage. An actuator member extends from the clamping member and is operable for causing the clamping member to move into and out of the passage to engage and disengage the flexible elongated member therein. A locking mechanism is utilized to releasably fix the clamping member in one of a plurality of engaged positions.

15 Claims, 3 Drawing Sheets

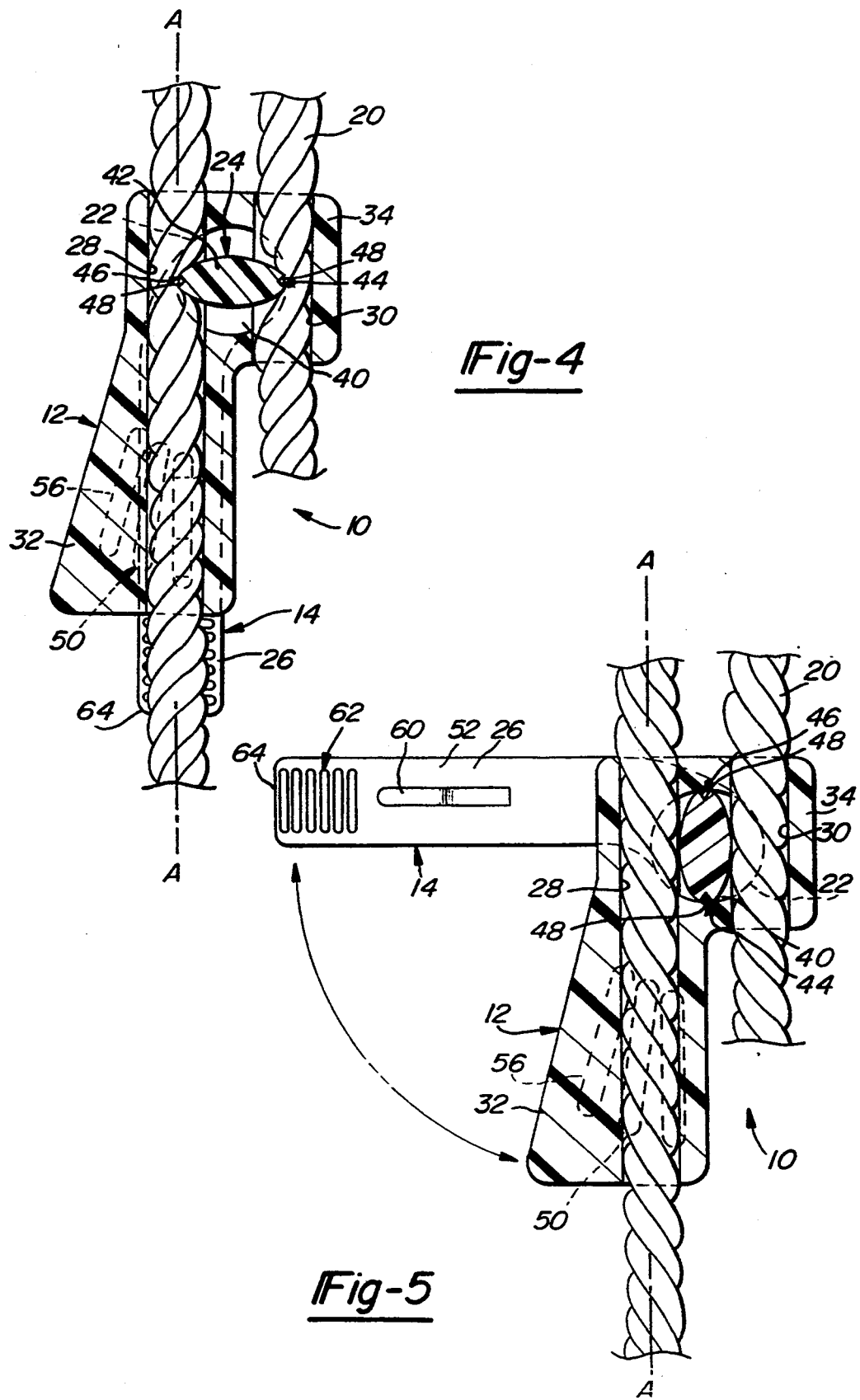

APPARATUS FOR CLAMPING AN ELONGATED FLEXIBLE MEMBER

BACKGROUND AND SUMMARY OF THE INVENTION

This invention generally relates to clamps and, more particularly, to a mechanism that clampingly engages an elongated flexible member.

As is known, a number of devices are available that can be releasably affixed to an elongated flexible member, such as rope or the like. These devices are often referred to as "rope locks" or "rope clamps" and generally involve the use of a clamping member that is actuated into engagement with a rope, thereby pinching the rope and locking the mechanism with respect thereto. One particular prior art rope clamp comprises a body portion having a pair of tubular passages for receiving lengths of rope. A clamping member is rotatably disposed within the body member such that a portion of the clamping member can be rotated into and out of the tubular passages for clampingly engaging the lengths of rope therein. A lever arm extends from the clamping member to facilitate rotation of the clamping member between engaged and disengaged positions. Moreover, a locking mechanism is used to releasably fix the lever arm with respect to the body when in its engaged position, thereby preventing the clamping member from disengaging the ropes. Thus, in the engaged position the rope clamp is releasably fixed to the rope and in the disengaged position the rope is free to slide through the passages, thereby allowing the rope clamp to move longitudinally along the length of rope.

One of the drawbacks of this type of rope clamp is that it has only one operable position where the clamping member engages the rope. In other words, when the clamping member is pivoted to an engaged position, the clamping member extends into the tubular passage a predetermined amount. The clamping member cannot be rotated into the tubular passage any further to accommodate a smaller diameter rope or to further engage the clamping member with the rope. Likewise, with only one engaging position, the clamping member is unable to accommodate a larger rope or stiffer rope due to the inability of the clamping member to be rotated to the locked position. Moreover, the engaging pressure of the clamping member upon the rope cannot be controlled to allow the rope to slip when a predetermined tension is applied to the rope. Thus, it would be desirable to provide a rope clamp having a plurality of engaging positions which can be selectively utilized depending on the size of the rope, stiffness of the rope and desired clamping pressure to be applied to the rope. It would also be desirable to provide a rope clamp having an improved clamping member to better control clamping engagement with the rope.

The present invention provides these desirable features and overcomes the aforementioned disadvantages by employing an improved clamping member and a locking mechanism which selectively locks the clamping member in one of a plurality of engaged positions. Thus, the rope clamp of the present invention can accommodate ropes having varying diameters and stiffnesses. In addition, the rope clamp of the present invention can be engaged such that when a predetermined tension is applied to the rope, the rope is permitted to slip with respect to the rope clamp. Furthermore, the rope clamp of the present invention has a simplified two-piece design which is made of a lightweight plastic material and is easily manufactured, assembled and operated.

Additional objects, advantages, and features of the present invention will become apparent from the following description and appended claims, taken in conjunction with the accompanying drawings.

DETAILED DESCRIPTION OF THE DRAWINGS

Figure 2:
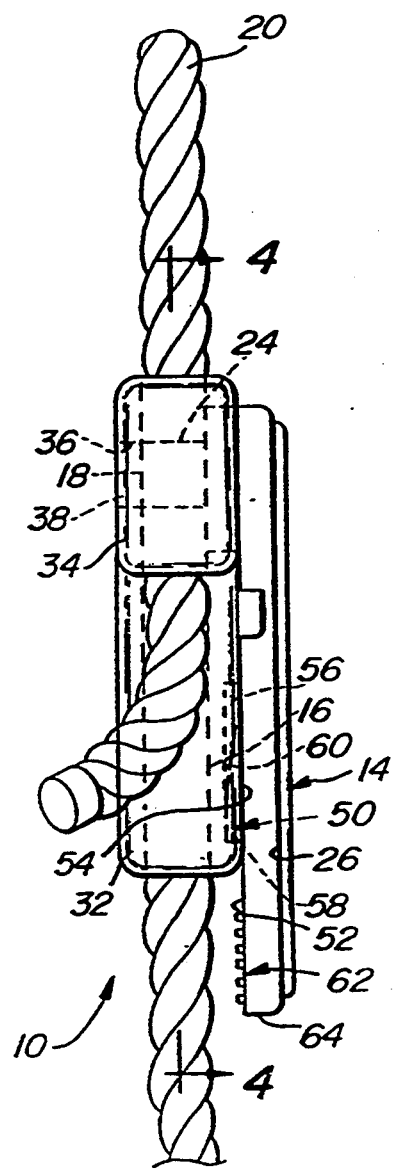
FIG. 2 is a side view of the clamping mechanism shown in FIG. 1.
Figure 3:
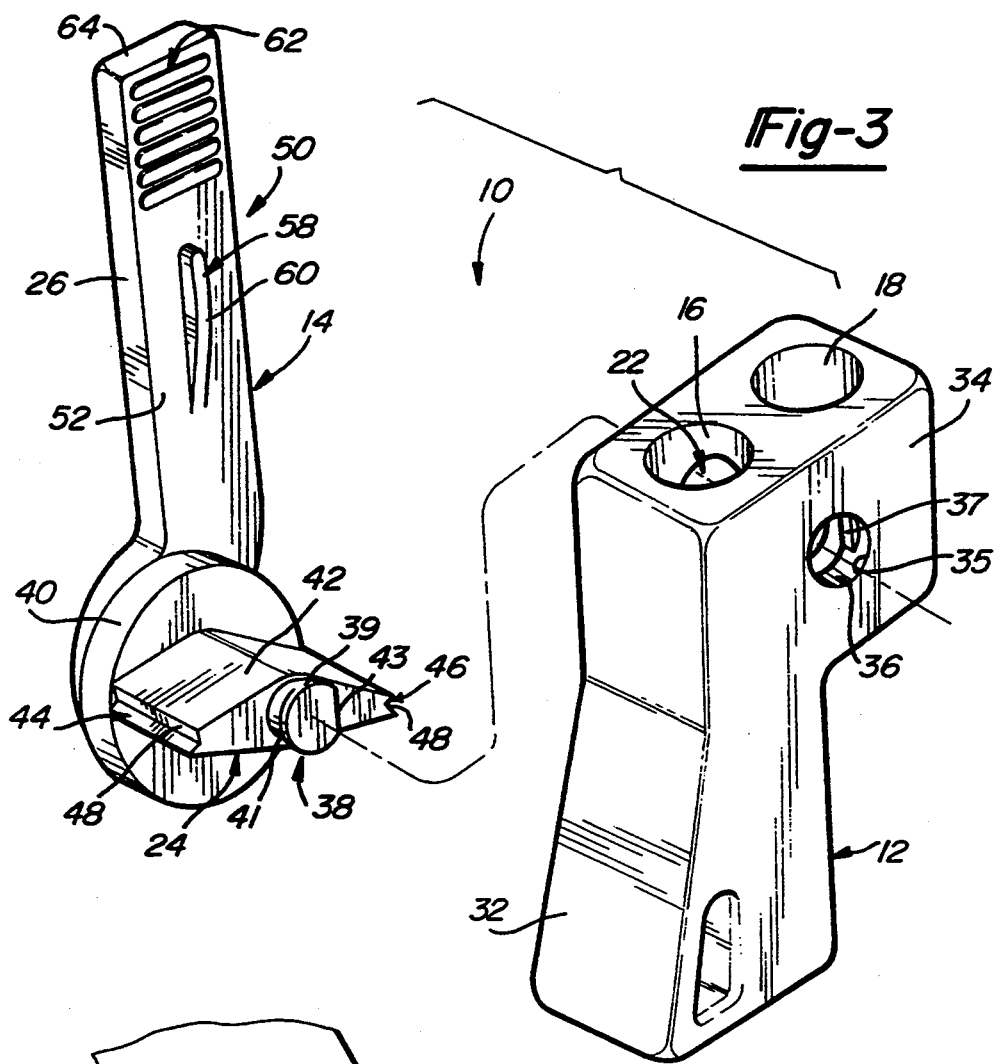
Figure 3A:
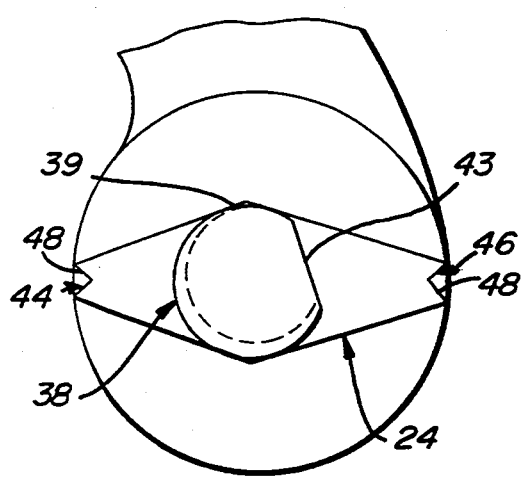
Figure 3B:
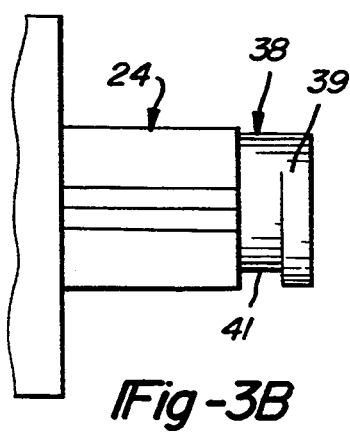

FIG. 3 an exploded perspective view of the clamping mechanism of the present invention illustrating the simplified two-piece design of the clamping mechanism which includes a body member having tubular passages therethrough and a clamping member which extends from an actuating lever;

FIG. 3A is a plan view of the clamping member which extends from the actuating lever in accordance with the principles of the present invention;

FIG. 3B is a side view of the clamping member which extends from the actuating lever in accordance with the principles of the present invention;

FIG. 4 is a cross sectional view taken through Section 4—4 in FIG. 2 illustrating lengths of rope extending through the tubular passages in the body portion with the clamping member clampingly engaging the lengths of rope against portions of the tubular passage walls in accordance with the principles of the present invention; and FIG. 5 is a cross sectional view similar to FIG. 4 illustrating the clamping member in a disengaged position such that the lengths of rope can freely slide through the passages.

DETAILED DESCRIPTION OF THE PREFERRED EMBODIMENT

Figure 1:
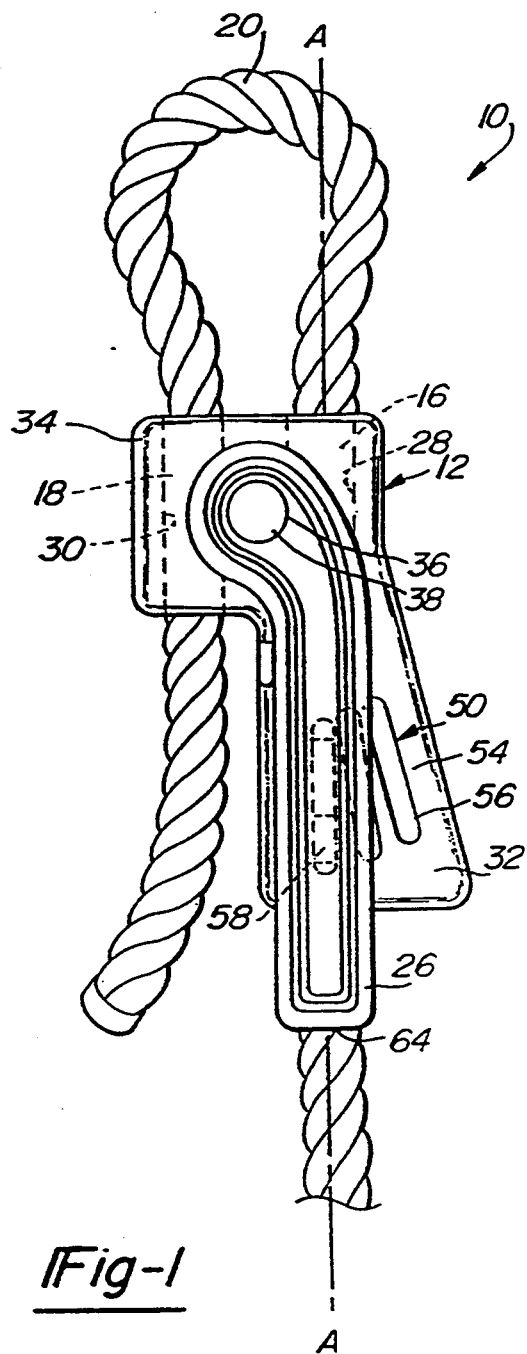
FIG. 1 is a plan view of the clamping mechanism of the present invention illustrating a single length of rope passing through both passages in the clamping mechanism with the clamping member engaged such that a fixed loop is created.

Referring now to the drawings, and in particular to FIGS. 1, 2 and 3, the clamping mechanism 10 of the present invention is shown. This clamping mechanism 10 is generally of a two-piece plastic construction including a body member 12 and a lever actuated clamp 14. Preferably, the two-piece plastic construction is made of 101 nylon thermo plastic. As is shown, the body member 12 has a pair of tubular passages 16 and 18 for simultaneously receiving two lengths of an elongated flexible member such as a rope 20 or the like. The body member 12 also has a bore 22 which rotatably houses a clamping member 24 that extends from the lever actuated clamp 14. As best shown in FIGS. 4 and 5, the clamping member 24 is moved between a disengaged position and clamping positions by pivoting the clamping member 24 with respect to the body member 12. This pivotal movement is accomplished by articulating a lever arm portion 26 of the lever actuated clamp 14. As shown in FIG. 5, when the lever arm 26 is pivoted to a disengaged position, the clamping member 24 does not extend into the tubular passages 16 and 18 and does not engage the rope 20. As a result, the rope 20 is able to slide freely through the tubular passages 16 and 18. As shown in FIG. 4, on the other hand, when the lever arm 26 is pivoted to an engaged position, portions of the clamping member 24 are rotated into the tubular passages 16 and 18 and clampingly engage the rope 20 against interior walls 28 and 30 of the tubular passages 16 and 18. As a result, the body member 12 is releasably fixed with respect to the rope 20, thereby preventing relative movement between the rope 20 and the body portion 12.

As best shown in FIG. 1, the body portion 12 is preferably L-shaped with a pair of tubular passages 16 and 18 extending therethrough. These tubular passages 16 and 18 are generally parallel to a longitudinal axis A—A which extends along an upstanding leg 32 of the L-shaped body portion 12. The passages 16 and 18 are adapted to receive lengths of rope 20 such that two ropes can be connected to one another or a loop can be created from a single length of rope. The body portion 12 also has a bore 22 that extends through the outwardly extending leg 34 of the L-shaped body portion 12, generally transverse to the longitudinal axis A—A. The central axial axis of this bore 22 passes between the two tubular passages 16 and 18 and the diameter of the bore 22 is great enough that the bore 22 communicates with both tubular passages 16 and 18. Thus, when the clamping member 24 is inserted into the bore 22, it can be rotated into engagement with both lengths of rope 20 extending through the passages 16 and 18, as shown in FIGS. 4 and 5.

In a preferred embodiment, one end of the bore 22 has a reduced diameter portion 36 for operably receiving the outwardly protruding end 38 of the clamping member 24. As best shown in FIGS. 3, 3A and 3B, the reduced diameter portion 36 has a rib 37 which extends radially inwardly from the outer circumferential surface 35 of the reduced diameter portion 36. This rib is operable for interlocking with the outwardly protruding end 38 of the clamping member 24 and maintaining the clamping member 24 in a held relationship within the bore 22. As can be seen, the outwardly protruding end 38 is generally cylindrical with an outer bearing surface 39 that engages the outer circumferential surface 35 of the reduced diameter portion 36. The outwardly protruding end 38 has a groove 41 that extends partially around the circumference thereof, and a flat 43 on one side. Thus, when the lever actuated clamp 14 is inserted into the bore 22 in body member 12, the flat 43 must first be aligned with the rib 37 such that the outwardly protruding end 38 can be inserted into the reduced diameter portion 36. When fully inserted, the rib 37 is positioned at one end of the groove 41 and the clamping member 24 can be rotated within the bore 22.

A cylindrical portion 40 of the clamping member 24 adjacent to the lever arm 26 also serves as a bearing surface for rotational movement of the clamping member 24. This cylindrical portion 40 of the clamping member 24 has approximately the same diameter as the bore 22 and is housed therein for rotational movement of the clamping member 24. Thus, as the lever arm 26 is articulated with respect to the body 12, the clamping member 24 rotates upon the respective bearing surfaces of both cylindrical portions 38 and 40 and the bores 22 and 36.

Note, the lever arm 26 is only free to be rotated when the rib 37 extends into the groove 41. Thus, when the clamping member 24 is first inserted into the bore 22, it will only rotate in one direction since the groove 41 only extends in one direction. Consequently, the body 12 and the lever actuated clamp 14 are easily assembled and cannot be accidentally misassembled. Moreover, when the lever arm 26 is rotated such that the rib 37 extends into the groove 41, the clamping member 24 cannot be withdrawn from the bore 22, however, the clamping member 24 is free to rotate within the bore 22.

As shown in FIGS. 3, 4 and 5, the clamping member 24 has an elongated engaging portion 42 centrally disposed between the outwardly protruding end 38 of the clamping member 24 and the larger diameter cylindrical portion 40 adjacent to the lever arm 26. Preferably, this elongated engaging portion 42 has a generally elliptical cross section such that when in a disengaged position, the vertices 44 and 46 of the elliptically shaped engaging portion 42 do not extend into the tubular passages 16 and 18. However, when in an engaging position, the vertices 44 and 46 at each end of the elliptical engaging portion 42 extend into an adjacent tubular passage 16 or 18. In this position, the engaging portion 42 clampingly engages the rope 20 against adjacent interior surfaces 28 and 30 of the tubular passages 16 and 18, as shown in FIG. 4. To enhance the clamping engagement between the engaging portion 42 and the rope 20, the vertices 44 and 46 are preferably notched as shown in FIGS. 3 and 3A.

As can be seen in FIG. 3, the engaging portion 42 of the clamping member 24 has a generally elliptical cross section across its entire width. Consequently, each vertex 44 or 46 is capable of engaging a corresponding length of rope 20 along the entire thickness of the engaging portion 42. In other words, the distal notched edges 48 of the elliptically shaped engaging portion 42, at the vertices 44 and 46 of the ellipse, have lengths equal to the distance between the larger diameter cylindrical portion 40 and the outwardly protruding end 38 of the clamping member 24. Preferably, this width is approximately equal to or slightly smaller than the diameter of the tubular passages 16 and 18 in the body portion 12. In any event, this notched distal edge 48 of the elliptically shaped engaging portion 42 provides a distributed load on the rope 20 when rotated into full clamping engagement, as shown in FIG. 4. However, when the engaging member 42 is rotated into an engaging position, but is not rotated into full engagement, only the middle portion of the distal notched edge 48 clampingly engages a tangential portion of the rope 20. Thus, the amount of clamping engagement between the engaging portion 42 and the rope 20 can be adjusted by selectively rotating the distal notched edge 48 of the engaging portion 42 into various degrees of clamping engagement.

By controlling the amount of clamping engagement against the rope 20, the clamping mechanism 10 can be adjusted to permit the rope 20 to slide within the tubular passages 16 and 18 when a predetermined tension is applied to the rope 20. In addition, since the clamping member 24 can be selectively rotated into various positions within the tubular passages 16 and 18, such that the distance between the distal notched edge 48 of the engaging portion 42 and the adjacent tubular walls 28 and 30 can be varied, the clamping mechanism 10 can accommodate a variety of rope sizes and stiffnesses which could not otherwise be done with a clamping mechanism having only a single locked position. Thus, the present invention provides the unique advantage of selectively positioning the clamping member 24 within the tubular passages 16 and 18 in a variety of positions.

In order to lock the engaging portion 42 in an engaging position, a locking mechanism 50 is provided between the upstanding leg 32 of the L-shaped body portion 12 and the lever arm 26 extending from the clamping member 24. As best shown in FIGS. 3, 4, and 5, this locking mechanism 50 involves cooperating structure located on apposing surfaces 52 and 54 of lever arm 26 and the upstanding leg 32 of the body portion 12. As is shown, a plurality of elongated detents or grooves 56 are provided in the upstanding leg 32 of the body member 12. In addition, a corresponding rib 58 extends from the apposing surface 52 on the lever arm 26 such that when the lever arm 26 is rotated to a position where the rib 58 is aligned with one of the grooves 56, the rib 58 will drop into the groove 56, thereby releasably fixing the lever arm 26 with respect to the body portion 12. Accordingly, the engaging portion 42 can be releasably fixed in any one of a plurality of engaged clamping positions and cannot freely rotate out of engagement. Furthermore, in order to prevent the lever arm 26 from being rotated beyond the last position, a stop 45 is provided on the upstanding leg 32 of the body member 12 as shown in FIG. 1.

In order to ensure that the rib 58 drops into one of the corresponding grooves 56, apposing surfaces 52 and 54 on the body portion 12 and the lever arm 26 are configured to slidingly abut or have minimal clearance with respect to one another in a normal condition. This being the case, the rib member 58 will obviously interfere with the body member 12 when rotated toward an engaged clamping position since the rib member 58 extends from the lever arm 26 toward the body member 12. Thus, when the lever arm 26 is moved from the position shown in FIG. 5 to the position shown in FIG. 4, the lever arm 26 is cammed away from the body portion 12 by a curved ramped surface 60 on the rib 58. This causes the lever arm 26 to be spring biased toward the body portion 12. Accordingly, when the rib 58 is moved to a position where it is aligned with a corresponding groove 56, it is urged into the groove 56. In order to assist disengagement of the rib 58 from the grooves 56, a plurality of gripping slots and/or grooves 62 are provided at the distal end 64 of the lever arm 26 as shown in FIG. 5. Thus, when it is desirable to move the lever arm 26 to another position, pressure is applied to the lever arm 26 at the gripping slots and/or grooves 62, forcing the lever arm 26 away from the body member 12 until the rib member 58 clears the outer surface of the body member 12. Thereafter, the lever arm 26 can be rotated to a desired position.

In short, the preferred embodiment of the rope clamp 10 of the present invention provides a unique mechanism for simultaneously clamping a pair of elongated flexible members such as rope 20. A clamping member 24 can be rotated and locked in a variety of positions thereby allowing the clamping mechanism 10 to accommodate a number of ropes sizes and stiffnesses. Moreover, the clamping mechanism 10 of the present invention has a simplified two-piece design which allows the rope clamp to be easily manufactured, assembled and operated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for clampingly engaging an elongated flexible member comprising:
   a body defining an opening therethrough for receiving a portion of an elongated flexible member;
   a clamping member at least partially disposed within said body, said clamping member associated with said body such that upon tightening of said clamping member, said clamping member moves sequentially between a released position where said clamping member does not reduce the size of said opening and a plurality of positions where said clamping member reduces the size of said opening and increasingly engage said elongated flexible member against a portion of said body;
   an actuating member extending from said clamping member operable for moving said clamping member between said positions; and
   a locking member for selectively locking said actuator member with respect to said body member in one of said plurality of clamping positions.

2. The apparatus of claim 1 wherein said locking member comprises a latch member that extends from said actuating member and engages one of a plurality of detents defined by said body such that when said latch member is engaged with one of said detents, said actuating member is releasably fixed with respect to said body, thereby releasably fixing said clamping member with respect to said body.

3. The apparatus of claim 1 wherein said clamping member integrally extends from said actuating member and has at least one circumferential bearing surface that engages a bore defined by said body, said clamping member being disposed within said bore such that said body and said clamping member rotate with respect to one another upon said bearing surface, said actuating member operable for rotating said clamping member between said released position and said clamping positions.

4. The apparatus of claim 1 wherein said clamping member is generally elongated and is disposed within said body for rotational movement, said elongated clamping member being generally parallel to said opening when said clamping member is in said released position such that said elongated clamping member does not extend into said opening, said elongated clamping member being generally perpendicular to said opening when in a clamping position such that said elongated clamping member extends into said opening.

5. The apparatus of claim 4 wherein a cross section through said elongated member is generally elliptical in shape.

6. The apparatus of claim 1 wherein each of said positions is defined by said clamping member spaced a certain distance from said body, said released position having the largest distance between said clamping member and said body and said plurality of clamping positions having distances between said clamping member and said body which progressively reduce as said clamping member further engages said elongated flexible member, said positions having larger distances providing a relatively small amount of clamping pressure and said positions having smaller distances providing a relatively greater amount of clamping pressure upon said elongated flexible member.

7. The apparatus of claim 1 wherein said clamping member is received by a bore defined by a circumferential surface within said body, said circumferential surface having a rib extending radially inwardly therefrom, into said bore, for engaging a groove defined by said clamping member, whereby said clamping member is free to rotate within said bore and is prevented from being withdrawn from said bore when said rib engages said groove.

8. A clamping apparatus comprising:
a body member defining a pair of passages that are side by side and generally parallel to one another for receiving a pair of elongated flexible members, said body member further defining a bore having an axial axis perpendicular to said passages, said bore passing through said body member between said passages with portions of said bore in communication with each of said passages;
a clamping member having a circumferential outer surface for engaging an inner surface of said bore, such that said clamping member is disposed for rotational movement within said bore, said clamping member further defining a pair of clamping surfaces adapted for simultaneous rotational movement into and out of said pair of passages within said body member, each of said clamping surfaces being spaced from a corresponding clamping surface within each of said passages such that as said clamping member is rotated, said clamping surfaces on said clamping member and said body member converge and diverge to respectively clampingly engage and disengage said flexible elongated members extending through said passages;
an actuator member extending from said clamping member operable for rotating said clamping member within said bore when said actuator member is articulated; and
a locking mechanism for releasably locking said clamping member in one of a plurality of clamping positions.

9. The clamping apparatus of claim 8 wherein said locking mechanism comprises a latch member that extends from said actuator member and engages one of a plurality of detents defined by said body member such that when said latch member is engaged with one of said detents, said actuator member is releasably fixed with respect to said body member, thereby releasably fixing said clamping member with respect to said body member.

10. The clamping apparatus of claim 8 wherein said body member and said clamping member are made of a plastic material.

11. The clamping apparatus of claim 8 wherein said clamping member is generally elongated and said clamping surfaces are disposed at each of the distal tips of the elongated clamping member, said clamping member being generally parallel to said passages when said clamping member is in said released position and being generally perpendicular to said passages when in a clamping position.

12. The clamping apparatus of claim 11 wherein a cross section through said elongated member is generally elliptical in shape.

13. The clamping apparatus of claim 8 wherein said body member is generally L-shaped having an upstanding leg and an outwardly extending leg, said outwardly extending leg having both of said passages and said bore passing through it, said upstanding leg having one passage passing through it and being generally elongated along a longitudinal axis, said actuator member also being elongated and being coupled to said body member for pivoted movement with respect to said body member, said actuator member being generally perpendicular to said longitudinal axis of said upstanding leg when in said disengaged position, said actuator member extending substantially parallel to said longitudinal axis of said upstanding leg when said actuator member is pivoted to one of said clamping positions.

14. The clamping apparatus of claim 8 wherein said clamping member integrally extends from one end of said actuator member, generally perpendicular to a longitudinal axis of said actuator member.

15. The clamping apparatus of claim 8 wherein said circumferential outer surface of said clamping member defines a groove and said body member has a rib which extends into said bore and engages said groove when said clamping member is disposed within said bore for rotational movement.

* * * * *